United States Patent [19]

Watanabe et al.

[11] Patent Number: 4,632,315

[45] Date of Patent: * Dec. 30, 1986

[54] METHOD AND APPARATUS FOR ELECTROMAGNETICALLY CRUSHING, MIXING AND STIRRING SUBSTANCES BY EMPLOYING A MECHANICAL DRIVER

[75] Inventors: Yasuo Watanabe; Hideomi Kanno, both of Kanagawa, Japan

[73] Assignee: Fuji Electric Co., Ltd., Kanagawa, Japan

[*] Notice: The portion of the term of this patent subsequent to Jul. 22, 2003 has been disclaimed.

[21] Appl. No.: 436,693

[22] Filed: Oct. 26, 1982

[30] Foreign Application Priority Data

Oct. 30, 1981 [JP] Japan .................. 56-174010

[51] Int. Cl.$^4$ .............................................. B02C 17/00
[52] U.S. Cl. ........................................ 241/26; 241/30; 241/170; 241/284; 51/7
[58] Field of Search ............ 252/62.51; 523/300; 51/7, 163.1; 366/341, 349, 18, 273, 274; 241/1, 284, 301, 184, 170, 172, 26, 30

[56] References Cited

U.S. PATENT DOCUMENTS 2,852,586 9/1958 Steele .
2,880,554 4/1959 Simjian .
3,787,034 1/1974 Shvartsman et al. ............ 241/1 X
3,848,363 11/1974 Lovness et al. .................. 51/7
3,869,251 3/1975 Tsantker et al. .................. 241/1 X

FOREIGN PATENT DOCUMENTS 1456441 11/1976 United Kingdom ................ 51/7
403537 4/1974 U.S.S.R. .......................... 51/7
564950 7/1977 U.S.S.R. .
638370 12/1978 U.S.S.R. .

Primary Examiner—Mark Rosenbaum
Attorney, Agent, or Firm—Brumbaugh, Graves, Donohue & Raymond

[57] ABSTRACT

An apparatus and method for electromagnetically crushing, mixing and stirring substances is disclosed. The apparatus has a container for containing ferromagnetic or non-magnetic conductive working pieces together with substances to be processed, shifting magnetic field generators which act on and generate a random motion of the work pieces, and a mechanical driver which imparts a relative motion to said container on a plane generally parallel with the shifting direction of the shifting magnetic field generated by said shifting magnetic field generators. Similarly, the method comprises moving the container relative to shifting magnetic field generators on a plane generally parallel with the shifting directions of the generated magnetic fields.

5 Claims, 9 Drawing Figures

METHOD AND APPARATUS FOR ELECTROMAGNETICALLY CRUSHING, MIXING AND STIRRING SUBSTANCES BY EMPLOYING A MECHANICAL DRIVER

BACKGROUND OF THE INVENTION

This invention relates to an apparatus and method for electromagnetically processing substances by crushing, mixing and stirring the substances and more particularly to an apparatus having a container for containing ferromagnetic or non-magnetic conductive working pieces together with substances to be processed and means for providing a shifting magnetic field to act on and generate a strong random motion of the working pieces.

The background of the invention will be discussed with reference to a prior art apparatus for electromagnetically processing substances of the type described, for example, in the copending Watanabe et al application Ser. No. 417,204 filed Sept. 13, 1982 and assigned to the assignee of the present application. As shown in FIGS. 1 and 2, a prior art apparatus comprises a container 1 containing a number of working pieces 2 made of ferromagnetic or nonmagnetic conductive material together with substances to be processed, and facing upper and lower shifting magnetic field generators 3, 4 which sandwich the container 1 therebetween. Each of the shifting magnetic field generators 3, 4 is supplied with a coil 5 constructed of a three-phase a.c. winding for example and generates oppositely directed shifting magnetic fields as shown by arrows $\phi 1$, $\phi 2$.

In the apparatus thus constructed, voltage is induced in the working pieces placed in the shifting magnetic fields, allowing an eddy current to flow. Due to reciprocal action between the current and the shifting magnetic fields, an electromagnetic driving force acts on the working pieces in the direction of the shifting magnetic field. In the case where the working pieces are ferromagnetic, a sucking force, in addition to the aforementioned driving force, works in the directions of the shifting magnetic field generators 3, 4. In contrast a repulsive force operates on non-magnetic material. As a result, because of the abovementioned electromagnetic action, the working pieces generate a strong, high speed random motion in the container and act on the substances in the container to simultaneously crush, mix and stir the substances. The same electromagnetic effect may be obtained by installing a shifting magnetic field generator on either the upper or lower side. Such an apparatus as described has various applications including pulverizing and mixing pulverulent bodies, mixing and stirring liquids, preparing emulsion, forming minute air bubbles, promoting chemical reactions and so on.

The random motion of the working pieces varies with the size and quality of the working pieces, the volume of the container, the percentage fullness of the container with working pieces, the intensity of the shifting magnetic field and so on. According to the results of various tests that have been made, a minimum magnetic field intensity level is required to generate a random motion of working pieces when the volume of a container, the size of working pieces and the percentage fullness of the container with working pieces are fixed. However, operating at this minimum magnetic field intensity level makes it difficult to maintain a stable random motion of the working pieces. Therefore, in order to maintain a practical operating level, a magnetic field intensity sufficiently greater than the aforementioned minimum magnetic field intensity level must be provided. In other words, although the working pieces generate a random motion initially when the apparatus is operated at the minimum magnetic intensity required to generate the random motion, the random movement of the working pieces is gradually reduced because of sucking force and repulsive force produced between the working pieces and the shifting magnetic field generators, and due to magnetic sucking force, collision, frictional force and the like between the working pieces. Ultimately, the working pieces completely cease to move and are put to one side, overlapping one another.

As shown in FIG. 3, most of the working pieces 2, which are ferromagnetic substances, for instance, are attached onto the side of the container 1 without moving as they are being sucked by the shifting magnetic field generators 3, 4. The working pieces 2 line up in a posture like piled up building blocks stuck together under the influence of their magnetic sucking force. Since the working pieces are put in a standstill state, processing of the substances is suspended. This kind of phenomenon may occur even for non-magnetic working pieces. However, if the magnetic field intensity of the shifting magnetic field is increased to a certain value, the electromagnetic driving force in the direction of the shifting magnetic field will increase so that the lined up working pieces will crumple and start their random motion again, to restore to a regular operating condition. As long as a relatively high magnetic field intensity is maintained from the beginning of the operation, suspension of a random motion of the working pieces will not occur.

Accordingly, for practical operation of such an apparatus the magnetic field intensity is sufficiently greater than the minimum magnetic field intensity required to generate a random motion. Continuous operation is obtained by using a high magnetic field intensity so that the random motion is not suspended midway through the operation. However, the conventional method of operation requires the application of excessive magnetic field intensity even during regular operating conditions in which the working pieces would generate sufficient random motion with low magnetic field intensity, which results in excessive power consumption to that extent. More specifically, the magnetic field intensity is proportional to the coil current of a shifting magnetic field generator, and loss in the coil is proportional to the square of the current. According to test results, the magnetic field intensity required to restart the random motion of working pieces suspended during the regular operation while the magnetic field is being applied is 50–80% greater than the minimum magnetic field intensity required to generate the aforementioned random motion. For this reason, the conventional method of operation has disadvantages in low operating efficiency, since approximately twice as much power consumption is required for the regular operation during the whole period of operation. Also, because of increasing heat loss, a greater cooling capability of a coil cooler is required.

SUMMARY OF THE INVENTION

The present invention is directed to the aforementioned problem and is aimed at offering an energy-saving apparatus and method in order to obtain continuous stable operation with a low power consumption.

The above object of the apparatus of the present invention is accomplished by the provision of a mechanical driving means in an apparatus for electromagnetically processing substances using conductive working pieces in a container which also receives substances to be processed. The mechanical driving means provides a relative motion to the container against shifting magnetic field generators on a plane generally parallel with the shifting directions of the magnetic fields. Similarly, the method of the present invention comprises moving the container relative to shifting magnetic field generators on a plane generally parallel with the shifting directions of the generated magnetic fields.

Other advantages and objects will become apparent from the following detailed description and accompanying drawings.

DETAILED DESCRIPTION OF THE PREFERRED EMBODIMENTS

Figure 1:
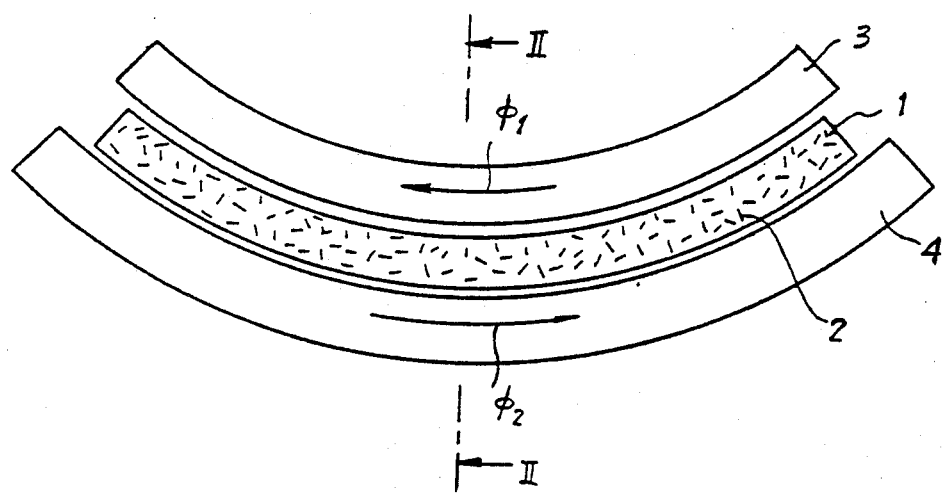
FIG. 1 is a schematic structural view of an apparatus according to the prior art.
Figure 2:
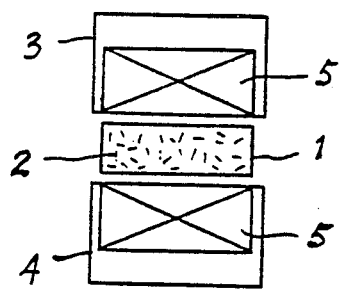
FIG. 2 is a cross-sectional view of a plane II—II of FIG. 1.
Figure 3:
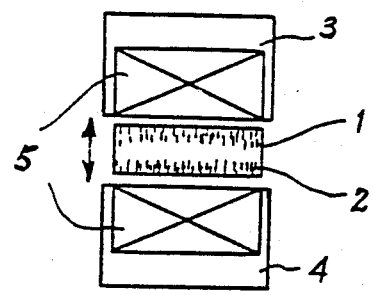
FIG. 3 is an operational diagram descriptive of the suspension of a random motion of working pieces by the operating method according to the prior art.
Figure 4:
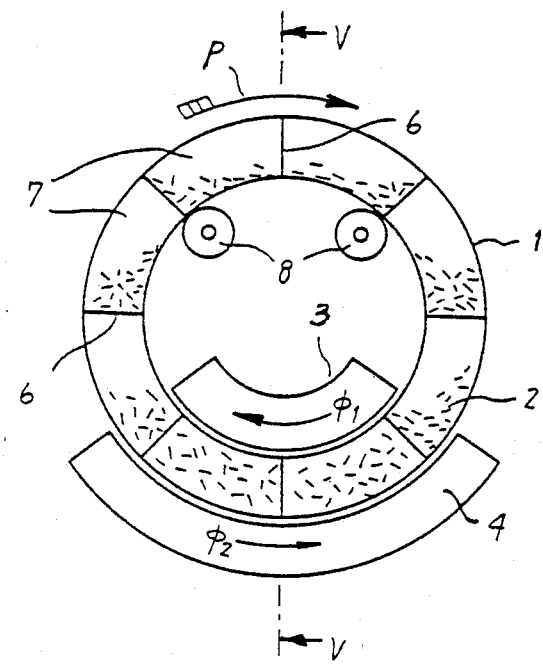
FIGS. 4, 6 and 7 are side views illustrating schematic structures of different embodiments of the present invention, respectively.
Figure 5:
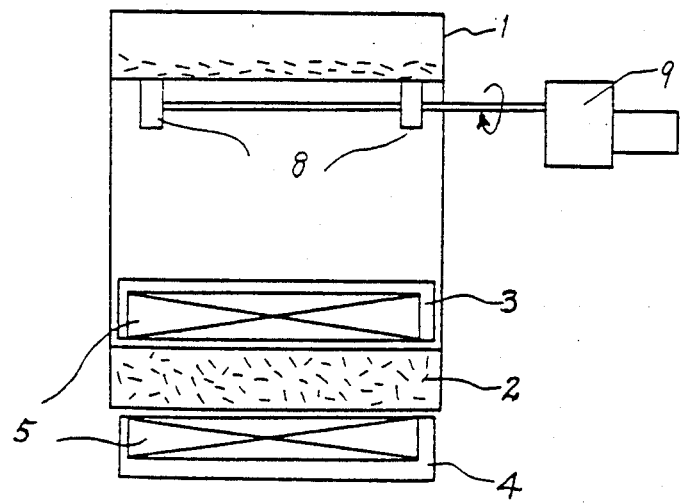
FIG. 5 is a cross-sectional view of a plane V—V of FIG. 4.

Referring to the embodiment shown in FIGS. 4 and 5, a ring-shaped container 1 containing working pieces 2 and substances to be processed is sandwiched between upper and lower circular arc-shaped shifting magnetic field generators 3, 4 and is partitioned by plates 6 into a plurality of chambers 7 lined up in the peripheral direction. The container 1 is supported by guide rollers 8 in such a way that the container is rotatable relative to the shifting magnetic field generators 3, 4, while driving gear 9 is connected to the guide rollers 8. By the operation of the driving gear 9 in the apparatus thus constructed, the container 1 is continuously turned in a direction shown by an arrow P opposed to the direction $\phi 2$ of a shifting magnetic field.

The description of the operation of the apparatus thus constructed will now be given. Power is supplied to the shifting magnetic field generators 3, 4 and the container 1 is driven to turn by energizing driving gear 9. When each chamber 7 successively passes through the regions of the shifting magnetic field generators 3, 4, the chamber is placed under action of the shifting magnetic field, so that the working pieces 2 in the chamber are given a random motion and activated to process the substances. During this process, the working pieces 2 generate the random motion in the partitioned chamber 7 enclosed by walls and moved in the direction of P. Accordingly, this increases the incidence of working pieces 2 colliding with the intermediate plates 6 and other walls of the partitioned chamber 7. With such a strong force imparted to the working pieces as a stimulus, the random motion increases, and as a result, even if the apparatus is operated at the minimum value required to generate random motion, the random motion is satisfactorily prevented from being suspended.

In addition to the random motion imparted by the electromagnetic force, since the substances are properly stirred and mixed in the container from the mechanical standpoint as the container rotates, substances at one side in the corner of the container can be drawn out to the central portion of the chamber where the substances are sufficiently processable by the working pieces. In this manner, uniform processability is achieved with improved efficiency. Use of an intermediate plate 6 tilted toward the radiating direction or one with a rugged surface will promote the aforementioned effects because the movement of the working pieces 2 colliding with such a surface can be made further random. Although circular arc-shaped shifting magnetic field generators 3, 4 have been illustrated in the drawing, those which are circular and concentric with the container 1 are similarly effective in obtaining the same effect. Further, shifting magnetic field may be installed on either upper or lower side of the container.

Figure 6:
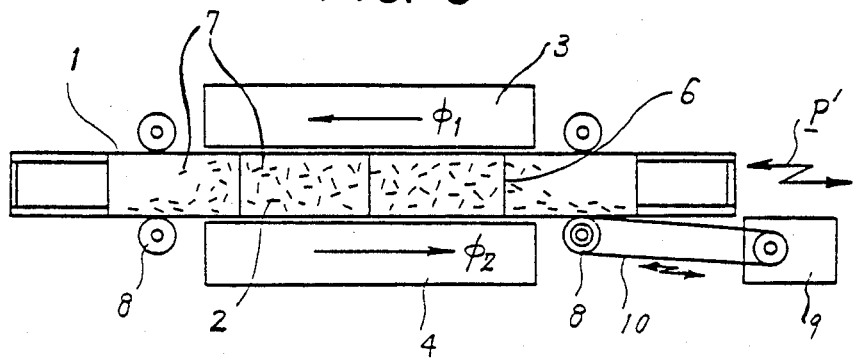

FIG. 6 illustrates another embodiment of the present invention in a different form. In this embodiment the container 1 and shifting magnetic field generators 3, 4 are essentially totally flat. In addition, the container 1 is made to reciprocally move as shown by an arrow P' in parallel with the shifting directions $\phi 1$, $\phi 2$ of the magnetic fields against the shifting magnetic field generators 3, 4, via the guide rollers 8, the driving gear 9 and a chain or belt 10 for the transmission of power.

In the apparatus thus constructed, the random motion of the working pieces can be continuously maintained satisfactorily by allowing the container 1 to reciprocally move relative to the shifting magnetic field generators 3, 4 during operation while maintaining the minimum magnetic field intensity required to generate a random motion of the working pieces 2. Furthermore, an effect in stirring the substances to be processed because of the movement of container 1 is added, and the same effect as that in the aforementioned example is achieved.

Figure 7:
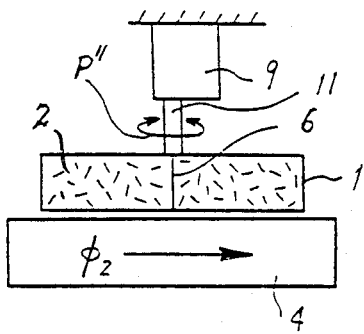
Figure 8:
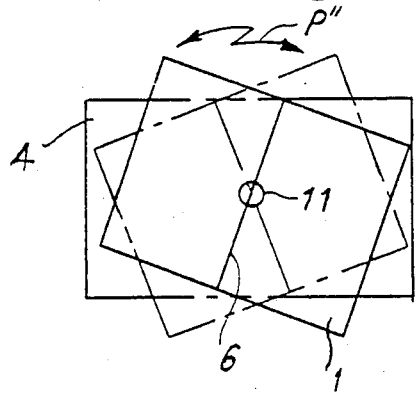
FIG. 8 is a plan view of FIG. 7.

FIGS. 7 and 8 illustrate still another embodiment of the present invention. In this example, the container 1 is connected to the driving gear 9 via a rotary shaft 11 in such a way that the container will reciprocally rotate in the direction of P' on and around the axis at a right angle to the shifting direction $\phi 2$ of the magnetic field while the container is kept generally in parallel with the shifting magnetic field generator 4. By reciprocally turning the container 1 during its operation, the relative angle to the wall of the container, against the shifting direction $\phi 1$ of the magnetic field changes moment by moment. Therefore, the angle at which the working pieces 2 subjected to electromagnetic force collide with the walls of the container 1 changes. In other words, the angle of force at which the moving wall surface gives force to the working pieces changes and further promotes the random motion of the working pieces within the container. Since working pieces evenly collide with substances even in the corner of the container, variations in the amount of processing that the substances in different locations of the container are reduced. Therefore, all regions in the container can be used for processing purposes. Therefore, the same effect as that obtained in the preceeding embodiments is achieved.

Figure 9:
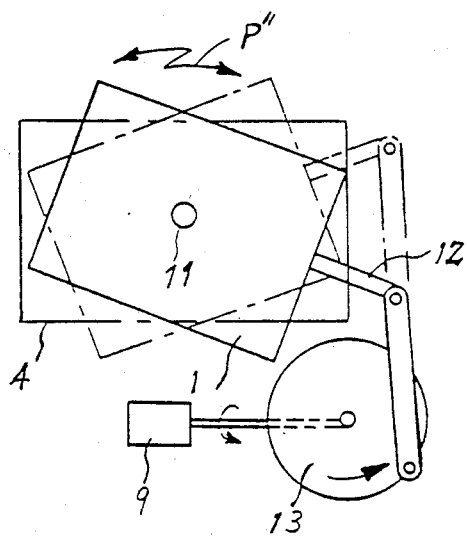
FIG. 9 is a plan view illustrating a schematic structure of still another embodiment according to the present invention.

In the embodiment of FIG. 7, the shifting magnetic field generator was installed only under the container, but the installation of the generators on both the upper and lower sides gives the same effect as the aforementioned. Particularly when shifting magnetic field generators are installed on both upper and lower sides of the container, the mutual interference of both the shifting magnetic field generators can be avoided with a reciprocal rotary mechanism formed by connecting a crank driving mechanism 13 to a connecting rod 12 led to the side of the container 1 as shown in FIG. 8. In the embodiments shown in FIGS. 7–9, the same effects are obtainable by continuously turning the container 1 instead of by reciprocally turning it.

As mentioned above, the container according to the present invention is moved in a shifting magnetic field to provide a mechanical stimulus to randomly move the working pieces. As a result, it is less probable that the random motion of the working pieces is suspended even though only the minimum shifting magnetic field intensity level required to generate the random motion is employed. Thus, a sharp reduction in power consumption in shifting magnetic field generators and cooling capability of coil cooling devices because of the movement of the containers, and an apparatus for processing materials with excellent performance can be offered.

From the foregoing, it will be observed that numerous variations may be effected without departing from the true spirit and scope of the novel concept of the invention. It is to be understood that no limitation with respect to the specific apparatus or method illustrated herein is intended or should be inferred. It is of course, intended to cover by the appended claims all such modification as fall within the scope of the claims.

We claim:

1. An apparatus for electromagnetically processing substances comprising:
   an elongated container having two opposed generally parallel sides for receiving working pieces responsive to a magnetic field and substances to be processed,
   a first shifting magnetic field generator adjacent to one side of the container producing a magnetic field which shifts in one direction within the container and a second shifting magnetic field generator adjacent to the opposite side of the container producing a magnetic field which shfits in the opposite direction within the container, the first and second shifting magnetic field generators being effective to impart a violent random motion to the working pieces due to electromagnetic force applied by said shifting magnetic field generators to thereby crush, mix and stir the substances to be processed; and
   a mechanical driving means for imparting a relative motion to said container between said first and second shifting magnetic field generators in a direction generally parallel to the shifting directions of said shifting magnetic fields, to thereby substantially maintain random motion of said working pieces.

2. An apparatus for electromagnetically processing substances as claimed in claim 1, wherein said container has a generally ring shape and is partitioned into a plurality of chambers along its peripheral direction, and wherein the first and second shifting magnetic field generators have a generally circular shaped arc portion and are positioned on opposite sides of said container, and wherein said mechanical driving means comprises means for turning said container on its axis to rotate said container adjacent said arc positions of said shifting magnetic field generators.

3. An apparatus for electromagnetically processing substances as claimed in claim 1, wherein said first and second shifting magnetic field generators are generally flat in shape, and wherein said container has a generally flat shape, and wherein said driving means comprises means for reciprocally moving said container in a direction generally parallel with the shifting directions of said shifting magnetic fields.

4. An apparatus for electromagnetically processing substances as claimed in claim 1, wherein said container has a generally flat shape, and wherein said first and second shifting mgnetic field generators are generally flat in shape and wherein said driving means comprises means for turning said container on an axis at a generally right angle to the shifting directions of said magnetic fields and in parallel with said first and second shifting magnetic field generators.

5. A method of electromagnetically processing substances in a container having two opposed generally parallel sides using working pieces responsive to a magnetic field to crush, mix and stir the substances, comprising:
   imparting random motion to the working pieces in the container using two shifting magnetic field generators producing magnetic fields which shift in opposite directions and act on the working pieces from the opposite sides of the container; and
   imparting motion to said container relative to the shifting magnetic field generators in a direction generally parallel with the shifting directions of said shifting magnetic fields, to thereby substantially maintain random motion of said working pieces.

* * * * *